United States Patent
Fejes et al.

(10) Patent No.: US 11,595,332 B2
(45) Date of Patent: *Feb. 28, 2023

(54) SYSTEM AND METHOD FOR TESTING OF AUTOMATED CONTACT CENTER CUSTOMER RESPONSE SYSTEMS

(71) Applicant: Cyara Solutions Pty Ltd, Hawthorn (AU)

(72) Inventors: Thomas Fejes, Freshwater (AU); Michael Monegan, Redwood City, CA (US)

(73) Assignee: CYARA SOLUTIONS PTY LTD, Hawthorn Vic (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/695,722

(22) Filed: Mar. 15, 2022

(65) Prior Publication Data

US 2022/0321512 A1 Oct. 6, 2022

Related U.S. Application Data

(63) Continuation of application No. 16/711,970, filed on Dec. 12, 2019, now Pat. No. 11,290,400, which is a
(Continued)

(51) Int. Cl.
| | |
|---|---|
| *H04M 3/28* | (2006.01) |
| *H04M 3/51* | (2006.01) |
| *H04M 7/00* | (2006.01) |
| *H04L 51/046* | (2022.01) |
| *G06F 11/36* | (2006.01) |
| *H04L 12/46* | (2006.01) |
| *H04L 43/50* | (2022.01) |
| *H04L 51/02* | (2022.01) |

(Continued)

(52) U.S. Cl.
CPC ........ *H04L 51/046* (2013.01); *G06F 11/3664* (2013.01); *H04L 12/4625* (2013.01); *H04L 43/50* (2013.01); *H04L 43/55* (2022.05); *H04L 51/02* (2013.01); *H04L 51/214* (2022.05); *H04M 3/28* (2013.01); *H04M 3/5175* (2013.01); *H04M 3/5191* (2013.01); *H04M 7/0045* (2013.01); *H04L 41/5083* (2013.01); *H04L 41/5093* (2013.01); *H04L 67/02* (2013.01)

(58) Field of Classification Search
CPC combination set(s) only.
See application file for complete search history.

(56) References Cited

U.S. PATENT DOCUMENTS

| | | | |
|---|---|---|---|
| 7,844,950 B2 | 11/2010 | Wu et al. | |
| 8,762,514 B2 | 6/2014 | Iijima | |

(Continued)

*Primary Examiner* — Amal S Zenati
(74) *Attorney, Agent, or Firm* — Galvin Patent Law LLC; Brian R. Galvin

(57) ABSTRACT

A system and method for testing of automated contact center customer response systems using a customer response testing system and a real time conversation engine, wherein the customer response testing system generates simulated human queries using persona profiles, sends test cases containing those queries to a contact center under test, and receives and analyzes the responses to determine whether the contact center's automated response systems understand the queries and respond appropriately.

8 Claims, 10 Drawing Sheets

Related U.S. Application Data continuation-in-part of application No. 16/392,504, filed on Apr. 23, 2019, now Pat. No. 10,873,546, which is a continuation of application No. 15/613,168, filed on Jun. 3, 2017, now Pat. No. 10,367,764, which is a continuation-in-part of application No. 15/491,965, filed on Apr. 19, 2017, now Pat. No. 10,268,571, which is a continuation-in-part of application No. 15/157,384, filed on May 17, 2016, now Pat. No. 10,230,836, which is a continuation of application No. 14/709,252, filed on May 11, 2015, now Pat. No. 9,344,556, which is a continuation of application No. 14/140,470, filed on Dec. 25, 2013, now Pat. No. 9,031,221, which is a continuation of application No. 13/936,183, filed on Jul. 6, 2013, now abandoned, which is a continuation-in-part of application No. 13/567,089, filed on Aug. 6, 2012, now abandoned, and a continuation-in-part of application No. 12/644,343, filed on Dec. 22, 2009, now Pat. No. 8,625,772, said application No. 15/491,965 is a continuation-in-part of application No. 15/083,259, filed on Mar. 28, 2016, now Pat. No. 10,659,402, which is a continuation-in-part of application No. 14/854,023, filed on Sep. 14, 2015, now abandoned, which is a continuation of application No. 14/141,424, filed on Dec. 27, 2013, now Pat. No. 9,137,184, which is a continuation of application No. 14/140,449, filed on Dec. 24, 2013, now Pat. No. 9,137,183, which is a continuation of application No. 13/936,147, filed on Jul. 6, 2013, now abandoned, which is a continuation-in-part of application No. 13/367,089, filed on Aug. 6, 2012, now abandoned, and a continuation-in-part of application No. 12/644,343, filed on Dec. 22, 2009, now Pat. No. 8,625,772, said application No. 14/141,424 is a continuation of application No. 13/936,186, filed on Jul. 6, 2013, now abandoned, which is a continuation-in-part of application No. 13/936,147, filed on Jul. 6, 2013, now abandoned.

(60) Provisional application No. 62/491,252, filed on Apr. 28, 2017.

(51) Int. Cl.
  *H04L 43/55* (2022.01)
  *H04L 51/214* (2022.01)
  *H04L 41/50* (2022.01)
  *H04L 67/02* (2022.01)

(56) References Cited

U.S. PATENT DOCUMENTS

| | | | |
|---|---|---|---|
| 8,990,629 B2 | 3/2015 | Salame | |
| 9,667,790 B1* | 5/2017 | Desai | H04L 65/1069 |
| 10,554,817 B1* | 2/2020 | Sullivan | H04L 41/5054 |
| 2004/0008825 A1* | 1/2004 | Seeley | H04M 3/22 |
| | | | 379/112.01 |

* cited by examiner

SYSTEM AND METHOD FOR TESTING OF AUTOMATED CONTACT CENTER CUSTOMER RESPONSE SYSTEMS

CROSS-REFERENCE TO RELATED APPLICATIONS

Priority is claimed in the application data sheet to the following patents or patent applications, the entire written description of each of which is expressly incorporated herein by reference in its entirety:
Ser. No. 16/711,970
Ser. No. 16/392,504
Ser. No. 15/613,168
62/491,252
Ser. No. 15/491,965
Ser. No. 15/083,259
Ser. No. 14/854,023
Ser. No. 14/141,424
Ser. No. 13/936,186
Ser. No. 13/936,147
Ser. No. 13/567,089
Ser. No. 12/644,343
Ser. No. 14/140,449
Ser. No. 15/157,384
Ser. No. 14/709,252
Ser. No. 14/140,470
Ser. No. 13/936,183

BACKGROUND OF THE INVENTION

Field of the Invention

The disclosure relates to the field of call center system testing, and more particularly to the field of testing of automated customer response systems used by contact centers.

Discussion of the State of the Art

Contact centers are central to the function of much of today's technological infrastructure, allowing for customers to contact either live human agents capable of answering queries regarding products and services, or automated response systems that attempt to do the same, sometimes referring customers to human agents for more complex queries. It is the case that many contact centers have now introduced such automated response systems first and foremost to handle customer queries before a live human agent may be reached, and in many cases perform inadequately for most customers, proving difficult to understand and use, not allowing for natural language to be used in responses to the automated systems, taking too long or being confusing to navigate, and more. This presents an issue for the businesses hiring these contact centers to handle customer inquiry, as it causes frustration and alienation with their customers and prevents helpful dialogue between customer and business from occurring. As well, chat and voice bots have become prevalent and are continuing to rise in usage. Despite the importance of chatbots and voicebots in modern contact centers, testing of such systems for accuracy and understandability is difficult and requires detailed manual scripting of testing routines for each desired test function.

Contact centers, as a result, frequently have inadequately tested systems which not only pose frustrations for customers, but may cause issues for customer retention. What is needed is an automated way to test these systems effectively and produce reports of the results of these tests.

SUMMARY OF THE INVENTION

Accordingly, the inventor has conceived and reduced to practice, a system and method for automated customer response testing that queries automated response systems at a client contact center, receives responses from the automated response systems, and analyzes the responses to determine whether the automated response systems are functioning properly. The system adds complexity to its queries using a "conversation multiplier" by generating queries based on "personas" that introduce variations that mimic real-world customer interactions. Further, the system can evaluate text and audio communications using a real-time conversation engine by assessing the context, meaning, and level of formality of the communication and, where necessary, generate responses customized to the style of the original text and audio communications, even additional cues such as environmental noises.

According to a preferred embodiment, a system for testing of automated customer response systems at contact centers is disclosed, comprising: a customer response testing system comprising a first plurality of programming instructions stored in a memory of, and operating a processor of, a computing device, wherein the first plurality of programming instructions, when operating on the processor, cause the computing device to: retrieve a test case from a test case database; retrieve a persona from a persona database; generate an ideal simulated customer query based on the test case; create variations of the ideal simulated customer query using a conversation multiplier, each variation reflecting a likely real-world variant of the ideal simulated customer query; modify each query variation based on the persona, each modification reflecting one or more traits of the persona; connect to a customer response system at a contact center; transmit each modified query variation of the ideal simulated customer query to a customer response system at a contact center; receive responses to each modified query variation sent from the customer response system at the contact center; analyze each response received to determine whether the response is appropriate to the modified query variation sent; and produce a result of the analysis.

According to a preferred embodiment, a method for testing of automated customer response systems at contact centers is disclosed, comprising the steps of: retrieving a test case from a test case database; retrieving a persona from a persona database; generating an ideal simulated customer query based on the test case as modified by the persona; creating variations of the ideal simulated customer query using a conversation multiplier, each variation reflecting a likely real-world variant of the ideal simulated customer query; modifying each query variation based on the persona, each modification reflecting one or more traits of the persona; connecting to a customer response system at a contact center; transmitting each modified query variation of the ideal simulated customer query to a customer response system at a contact center; receiving responses to each modified query variation sent from the customer response system at the contact center; analyzing each response received to determine whether the response is appropriate to the modified query variation sent; and producing a result of the analysis.

According to an aspect of an embodiment, a real time conversation engine receives one or more of the modified query variations; analyzes the one or more of the modified query variations to determine a context, dialect, or level of formality; receives a response corresponding to each of the one or more of the modified query variations; analyzes each to determine a context, dialect, or level of formality; and compares the analysis of each of the one or more of the modified query variations with the corresponding response for that modified query variation to determine an appropriateness of the response.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
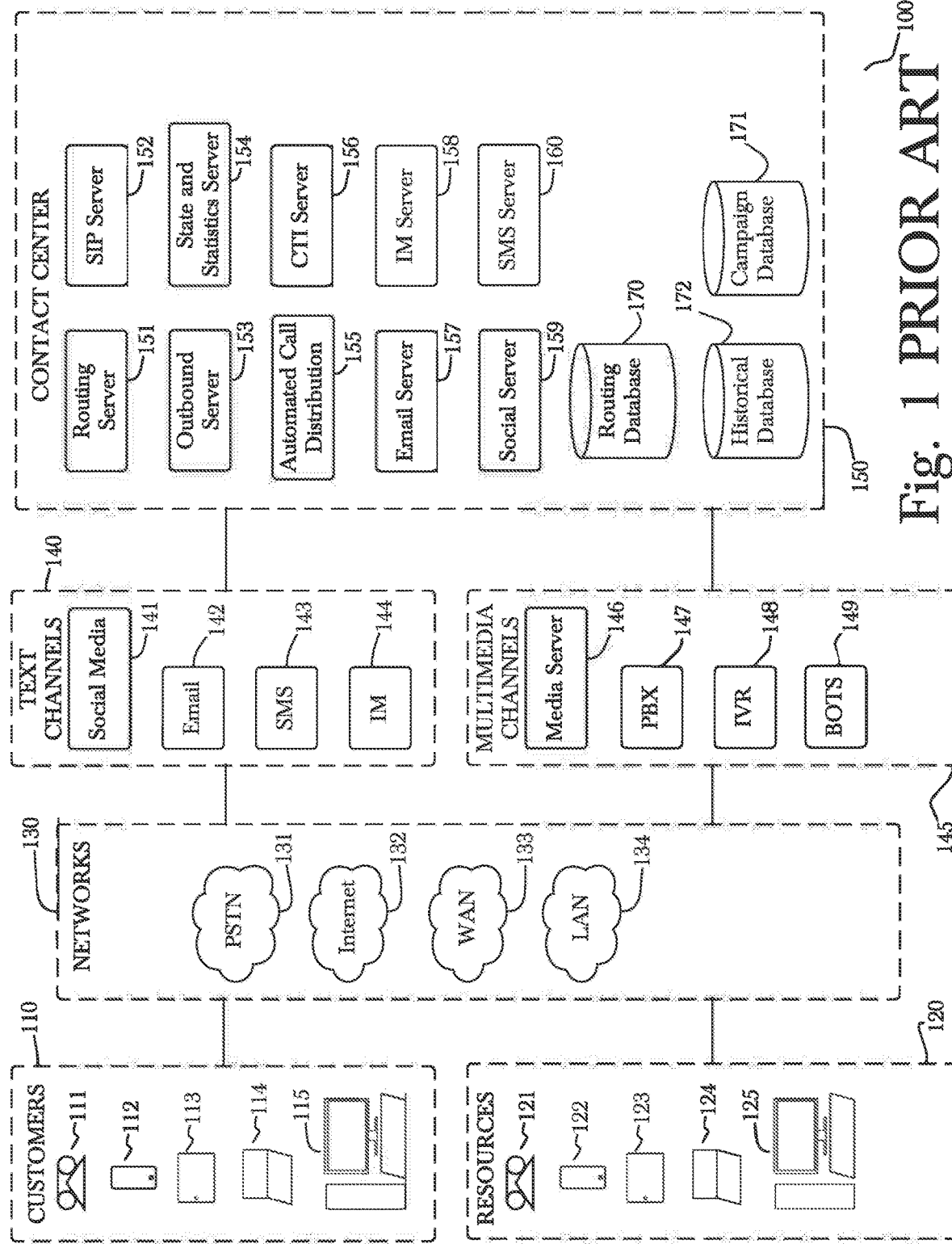
FIG. 1 (PRIOR ART) is a typical system architecture diagram of a contact center including components commonly known in the art.

The inventor has conceived, and reduced to practice, a system and method for automated customer response testing that queries automated response systems at a client contact center, receives responses from the automated response systems, and analyzes the responses to determine whether the automated response systems are functioning properly. The system adds complexity to its queries using a "conversation multiplier" by generating queries based on "personas" that introduce variations that mimic real-world customer interactions. Further, the system can evaluate text and audio communications using a real-time conversation engine by assessing the context, meaning, and level of formality of the communication and, where necessary, generate responses customized to the style of the original text and audio communications, even additional cues such as environmental noises.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "dialect" as used herein means a regional linguistic accent, vocabulary, phraseology, style, accent, or character, whether in writing or verbal speech.

The term "environment" as used herein means the environment in which a communication has been made, and includes, but is not limited to the audio environment in which spoken communication occurs and the platform on which a text communication is made (e.g. written communications typed on a computer tend to have fewer mistakes and abbreviations than those typed on a mobile phone).

The phrase "level of formality" as used herein means the formality with which a communication is made. For example, communications may be formal, such as in professional writing, formal social invitations, educational writing, and the like. Communications may be informal, such as in casual writing, and notes or letters between friends or close acquaintances. Communications may be very informal, such as in the use of abbreviations or slang, Short Message Service (SMS) codes and substitutions, emojis, and the like. The level of formality may provide indirect indications about the communicator, such as level of education, closeness between communicators, emotional content, etc.

Conceptual Architecture

FIG. 1 (PRIOR ART) is a typical system architecture diagram of a contact center 100 known to the art. A contact center is similar to a call center, but a contact center has more features. While a call center may communicate mainly by voice, a contact center may communicate via email; text chat, such as, but not limited to, instant messaging, social media posts, and SMS interaction; and web interfaces in addition to voice communication in order to facilitate communications between a customer endpoint 110 and a resource endpoint 120. Resource 120 may include, but is not limited to, agents, sales representatives, service representatives, or collection agents handling communications with customers 110 on behalf of an enterprise. Resources 120 may be in-house within contact center 100, or may be remote, such as out-sourcing to a third party, or agents working from home. Contact center 100 may be independently operated or networked with additional centers, and may often be linked to a corporate computer network.

Contact center 100 may further comprise network interface 130, text channels 140, multimedia channels 145, and contact center components 150. Text channels 140 may be communications conducted mainly through text, and may comprise social media 141, email 142, short message service (SMS) 143, or instant messaging (IM) 144, and would communicate through their counterparts within contact center components 150, each respectively being social server 159, email server 157, SMS server 160, and IM server 158.

Multimedia channels 145 may be communications conducted through a variety of mediums, and may comprise a media server 146, private branch exchange (PBX) 147, interactive voice response (IVR) 148, and bots 149. Text channels 140 and multimedia channels 145 may act as third parties to engage with outside social media services and so a social server 159 may be required to interact with the third-party social media 141. Multimedia channels 145, are typically present in an enterprise's datacenter; but could be hosted in a remote facility, in a cloud facility, or in a multifunction service facility.

Contact center components 150 may comprise a routing server 151, a session initiation protocol (SIP) server 152, an outbound server 153, a computer telephony integration (CTI) server 154, a state and statistics (STAT) server 155, an automated call distribution facility (ACD) 156, an email server 157, an IM server 158, a social server 159, a SMS server 160, a routing database 170, a historical database 172, and a campaign database 171. It is possible that other servers and databases may exist within a contact center, but in this example the referenced components are used. Contact center components 150, including servers, databases, and other key modules that may be present in a typical contact center may work in a black box environment, may be used collectively in one location, or may be spread over a plurality of locations. Contact center components 150 may even be cloud-based, and more than one of each component shown may be present in a single location.

Customers 110 may communicate by use of any known form of communication known in the art, be it by a telephone 111, a mobile smartphone 112, a tablet 113, a laptop 114, or a desktop computer 115, to name a few examples. Similarly, resources 120 may communicate by use of any known form of communication known in the art, be it by a telephone 121, a mobile smartphone 122, a tablet 123, a laptop 124, or a desktop computer 125, to name a few examples. Communication may be conducted through a network interface 130 by way of at least one channel, such as a text channel 140 or a multimedia channel 145, which communicates with a plurality of contact center components 150. Available network interfaces 130 may include, but are not limited to, a public switched telephone network (PSTN) 131, an internet network 132, a wide area network (WAN) 133, or a local area network (LAN) 134.

To provide a few example cases, a customer calling on telephone handset 111 may connect through PSTN 131 and terminate on PBX 147; a video call originating from tablet 123 may connect through internet connection 132 and terminate on media server 146; or a customer device such as a smartphone 112 may connect via WAN 133, and terminate on IVR 148, such as in the case of a customer calling a customer support line for a bank or a utility service. In another example, an email server 157 would be owned by the contact center 100 and would be used to communicate with a third-party email channel 142. The number of communication possibilities are vast between the number of possible devices of resources 120, devices of customers 110, networks 130, text channels 140, multimedia channels 145, and contact center components 150, hence the system diagram on FIG. 1 indicates connections between delineated groups rather than individual connections for clarity.

Continuing from the examples given above, in some conditions where a single medium (such as ordinary telephone calls) is used for interactions that require routing, media server 146 may be more specifically PBX 147, ACD 156, or similar media-specific switching system. Generally, when interactions arrive at media server 146, a route request, or a variation of a route request (for example, a SIP invite message), is sent to SIP server 152 or to an equivalent system such as CTI server 154. A route request may be a data message sent from a media-handling device, such as media server 146, to a signaling system, such as SIP server 152. The message may comprise a request for one or more target destinations to which to send (or route, or deliver) the specific interaction with regard to which the route request was sent. SIP server 152 or its equivalent may, in some cases, carry out any required routing logic itself, or it may forward the route request message to routing server 151. Routing server 151 executes, using statistical data from STAT server 155 and, optionally, data from routing database 170, a routing script in response to the route request message and sends a response to media server 146 directing it to route the interaction to a specific target in resources 120.

In another case, routing server 151 uses historical information from historical database 172, or real-time information from campaign database 171, or both, as well as configuration information (generally available from a distributed configuration system, not shown for convenience) and information from routing database 170. STAT server 154 receives event notifications from media server 146, SIP server 152, or both regarding events pertaining to a plurality of specific interactions handled by media server 146, SIP server 152, or both, and STAT server 155 computes one or more statistics for use in routing based on the received event notifications. Routing database 170 may comprise multiple distinct databases, either stored in one database management system or in separate database management systems. Examples of data that may normally be found in routing database 170 may include, but are not limited to: customer relationship management (CRM) data; data pertaining to one or more social networks, including, but not limited to network graphs capturing social relationships within relevant social networks, or media updates made by members of relevant social networks; skills data pertaining to a members of resources 120, which may be human agents, automated software agents, interactive voice response scripts, and so forth; data extracted from third party data sources including cloud-based data sources such as CRM and other data from SALESFORCE.COM™, credit data from EXPERIAN™, consumer data from DATA.COM™; or any other data that may be useful in making routing decisions. It will be appreciated by one having ordinary skill in the art that there are many means of data integration known in the art, any of which may be used to obtain data from premise-based, single machine-based, cloud-based, public or private data sources as needed, without departing from the scope of the invention. Using information obtained from one or more of STAT server 155, routing database 170, campaign database 172, historical database 171, and any associated configuration systems, routing server 151 selects a routing target from among a plurality of available resource devices 120, and routing server 151 then instructs SIP server 152 to route the interaction in question to the selected resource 120, and SIP server 152 in turn directs media server 146 to establish an appropriate connection between customer 110 and target resource 120. In this case, the routing script comprises at least the steps of generating a list of all possible routing targets for the interaction regardless of the real-time state of the routing targets using at least an interaction identifier and a plurality of data elements pertaining to the interaction, removing a subset of routing targets from the generated list based on the subset of routing targets being logged out to obtain a modified list, computing a plurality of fitness parameters for each routing target in the modified list, sorting the modified list based on one or more of the fitness parameters using a sorting rule to obtain a sorted target list, and using a target selection rule to consider a plurality of routing targets starting at the beginning of the sorted target list until a routing target is selected. It should be noted that customers 110 are generally, but not necessarily, associated with human customers or users. Nevertheless, it should be understood that routing of other work or interaction types is possible, although in any case, is limited to act or change without input from a management team.

Figure 2:
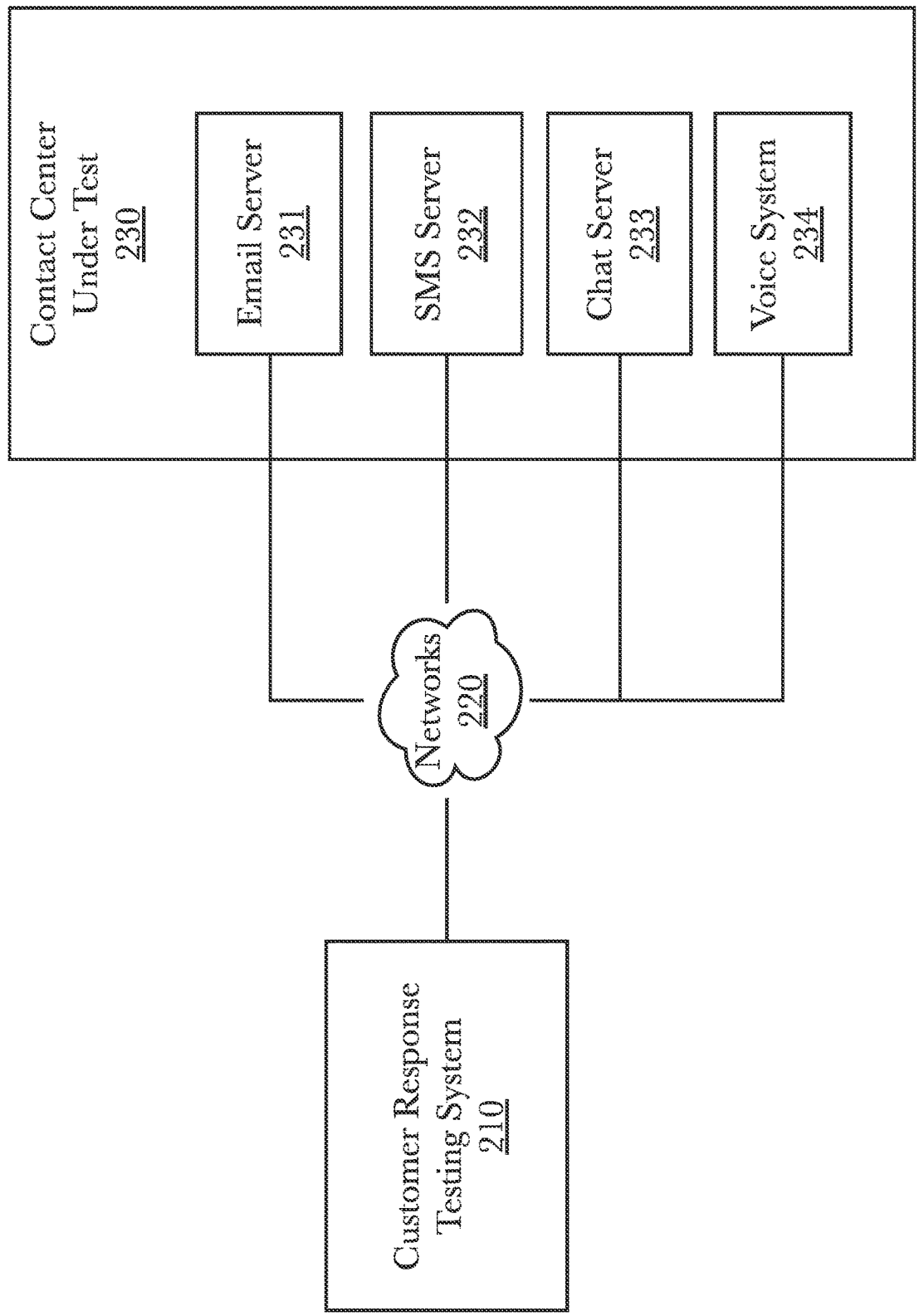
FIG. 2 is a diagram of an exemplary application of a customer response testing system implementation, showing the customer response testing system in relation to the contact center under test.
Figure 3:
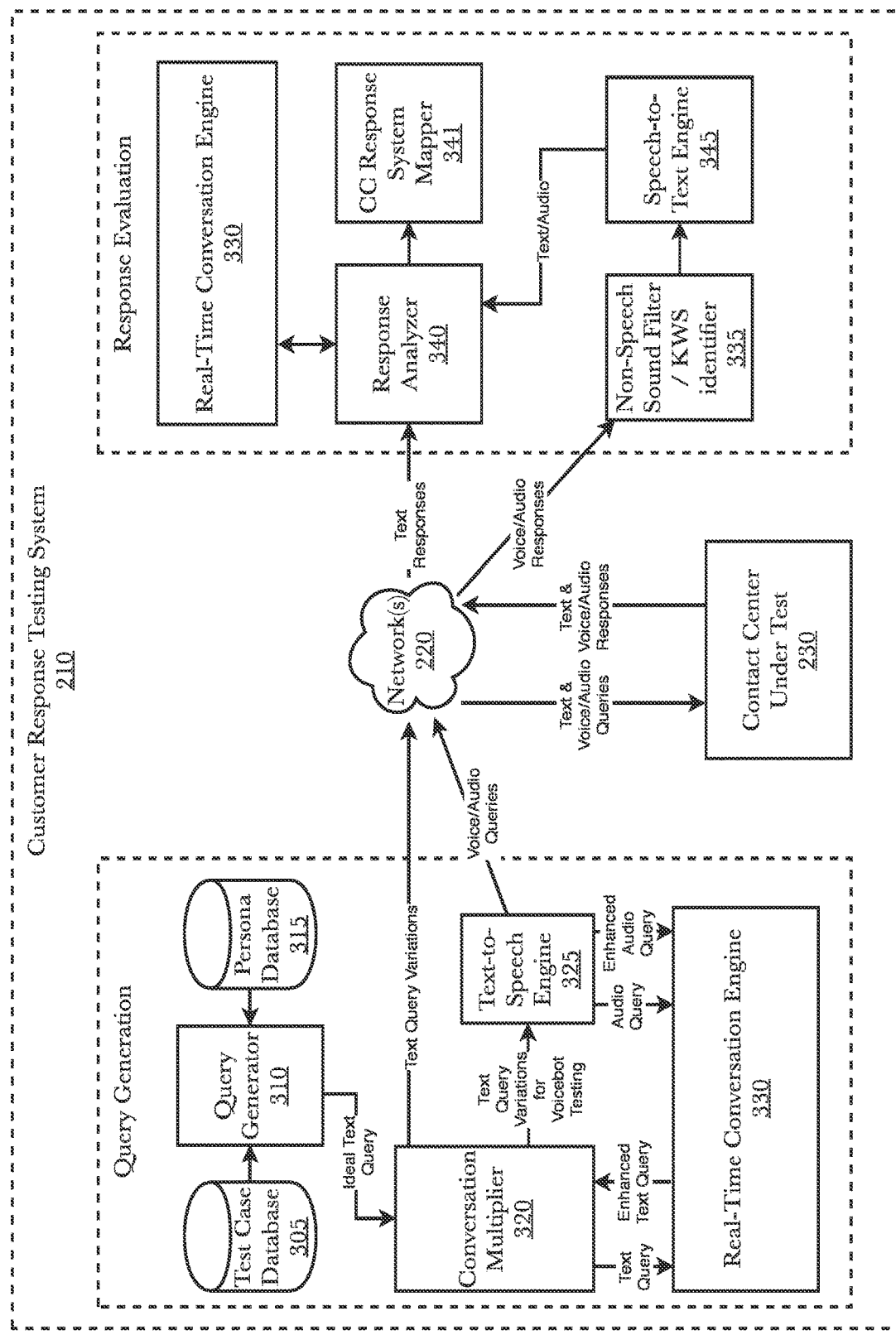
FIG. 3 is a diagram showing the overall system architecture of an exemplary customer response testing system.

FIG. 2 is a diagram of an exemplary application of a customer response testing system implementation, showing the customer response testing system in relation to the contact center under test. A customer response testing system 210 exists which communicates over at least one, and possibly a plurality of, networks 220, to a variety of servers used in the contact center under test 230, 231, 232, 233, 234. Networks 220 may include a Public Switched Telephone Network (PSTN), the Internet, a Wide Area Network (WAN), or a Local Area Network (LAN), or any other network common for telecommunications as is common in the art. In this way, a customer response testing system 210 may be able to send and receive emails from an email server 231, send and receive SMS messages from an SMS server 232, send and receive other text communications from a chat server 233, and send and receive voice data from a voice server 234, or some combination of these, such as sending an email and receiving an SMS response, or receiving an email as part of a voice server 234 query response, such as confirming a login into a user account over the phone, or two-factor authentication systems. The customer response testing system 210 generates queries for each type of communication under test, initiates a communication session, makes the query, receives a response to the query, and analyzes the response received. For instance, an email query may be sent from a customer response testing system 210, through a network or networks 220, to an email server in a contact center's infrastructure 231, which the contact center's automated email customer response system processes and formulates a reply being sent back through the appropriate server such as an email server 231, to be relayed back to the customer response testing system 210. Upon receipt of the automated response from the email server, the customer response testing system runs a series of tests to determine the quality of the response, including such things as how quickly the response was received, whether the response to the query makes sense in context, whether the response answers the question posed by the query, etc. The analysis helps to determine whether the automated customer response system received the query, properly understood the query, and generated an appropriate response. FIG. 3 is a diagram showing the overall system architecture of an exemplary customer response testing system. A query generator 310 retrieves a test case from a test case database 305 and retrieves a persona from a persona database 315. The test case database 305 contains data on the format and content of completed tests for the contact center under test, including some or a plurality of: initial query sent to the contact center, a response from the contact center, a secondary query sent to the contact center, and a further response from the contact center. Such queries and responses may be of the same sort (email, SMS, etc.) or may be of different types. The persona database 315 contains data on simulated personas to use in the generation of a contact center query. The persona is data representing a set of attributes for a simulated (hypothetical) customer who might interact with a contact center. For instance, an initial query from a test case in a test case database 305 may be modified to fit the persona of a person of a particular age, from a particular location, with certain applicable account or personal information which may be used in such an initial query, the confluence of the test case and the persona being used to generate a full query by the query generator 310. The query generator generates an ideal query (i.e., a direct and clear query without typographical errors, grammatical mistakes, idioms, and the like, which may occur in real-world queries) which is sent to a conversation multiplier 320, which produces both data for text and voice bot testing, and which multiplies a query by using alternative wording, mistakes, idiosyncrasies, neologisms, typos, and colloquialisms, or some combination or permutation of these, with the intent of testing whether these variations and alterations in phrasings of a query will be accepted by a contact center's automated response systems. The conversation multiplier 320 may additionally use input from the persona to generate queries that mimic the persona of a particular simulated person. For example, a particular persona may be a simulation of a person with a specific regional dialect who often rides a bus, in which case the queries produced by the conversation multiplier 320 for that persona will modify the ideal query to use the specific regional dialect with typographical errors introduced to simulate inaccuracies in type from riding on a moving bus. Further, in some embodiments, the conversation multiplier will obtain additional enhancements from a real-time conversation engine 330, whose purpose is to analyze communications for context, dialect, level of formality, etc., and either introduce variations based on those analyses into queries or determine the appropriateness of responses to queries. Query text may be sent directly from the conversation multiplier 320 to the real-time conversation engine 330, which will send back query text enhanced with contextual cues, regional or dialectical variants, or formality cues. After the queries are generated by the conversation multiplier, queries intended for text-based testing (e.g. email, chat, SMS) may be sent through the appropriate networks 220 to the contact center under test 230. For queries intended for audio-based testing (i.e., voice communications), the generated text queries are first fed into a text-to-speech engine 325, where the text of the query becomes converted to audio data corresponding to speech. In some embodiments, this audio may be sent to the real-time conversation engine 330 for enhancement (for example, to add environmental sounds such as transportation noises simulating a particular persona riding on a bus). The text-to-speech audio is then sent via an appropriate network 220 to the contact center under test 230.

Text responses from the contact center under test 230 are sent to a response analyzer 340, which compares the response with the original query to determine the quality and appropriateness of the response. In some embodiments, responses may be sent to the real-time conversation engine for further analysis, to determine whether the context, dialect, level of formality, etc., of the response matches the context, dialect, level of formality, etc., of the query. Audio responses from the contact center under test 230 may first be sent to a non-speech sound filter or keyword spotter 335 for analysis. The non-speech sound filter 335 attempts to clarify the received audio by filtering out any non-word or non-speech, or unimportant, audio data. The keyword spotter 335 attempts to identify key words and phrases in the speech audio. Keyword spotting is faster than full speech-to-text conversion and filtering. This filtered and/or searched data is then sent to a speech-to-text engine 345 before being forwarded to the response analyzer 340 for analysis in the same manner as for text-based communications. In some embodiments, the audio response may also be sent to the response analyzer 340 to use in conjunction with the real-time conversation engine to determine whether the context, dialect, level of formality, etc., of the response matches the context, dialect, level of formality, etc., of the query. In some embodiments, the responses and queries will be sent to a contact center system mapper 341 to map the contact center's response system (e.g. on a voice call, mapping the DTMF tones associated with voice prompts in the system).

Figure 4:
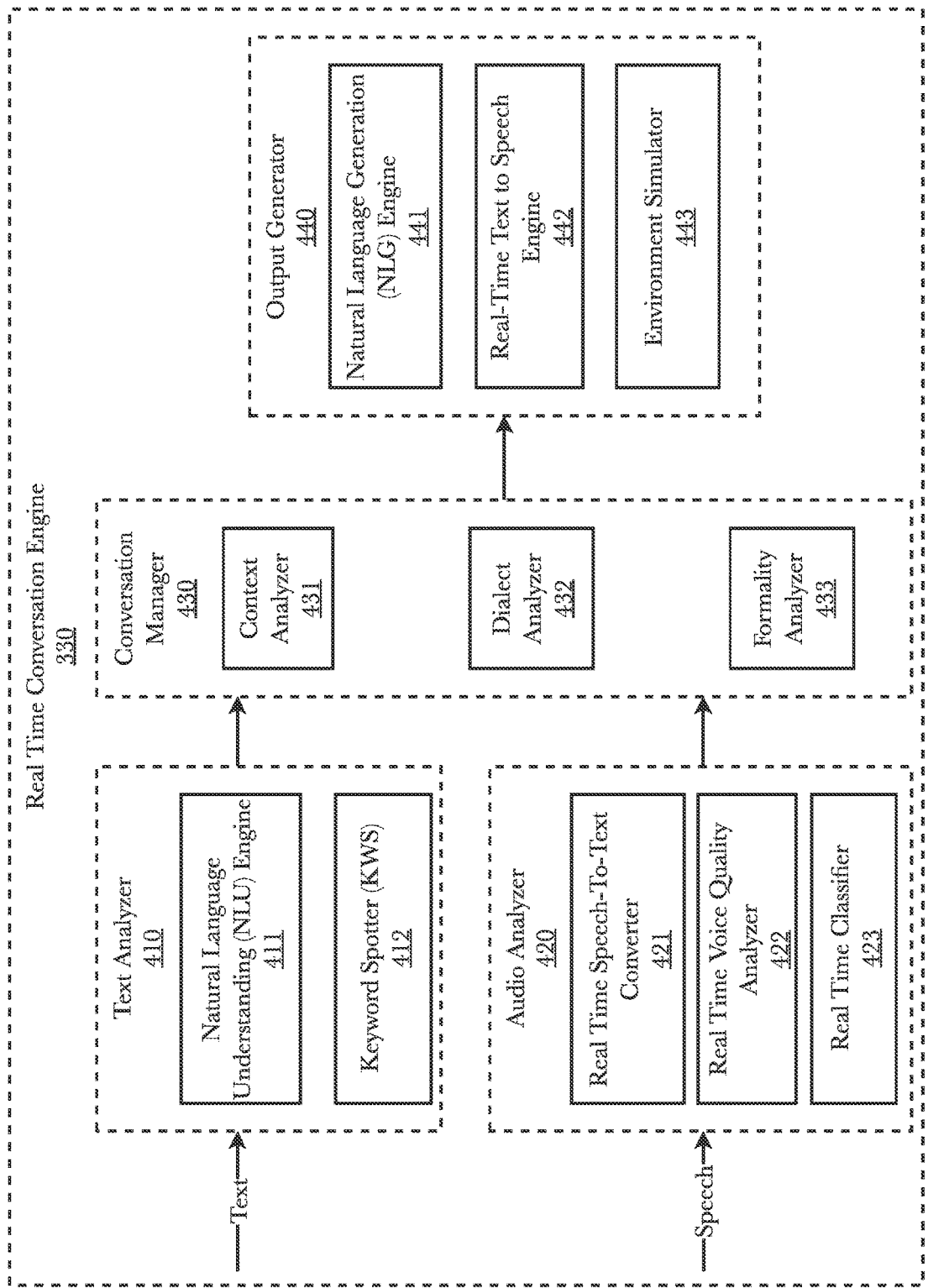
FIG. 4 is a block diagram showing an aspect of the customer response testing system, the real time conversation engine.

FIG. 4 is a block diagram showing an aspect of the customer response testing system, the real time conversation engine 330. As text is received, a text analyzer 410 uses a natural language understanding (NLU) engine 411 to analyze groupings of words or sentence fragments, punctuation, and individual words in order to understand language meaning for a given textual input. Simultaneously, a keyword spotter (KWS) 412 may locate individual high-value words such as nouns in a sentence faster than full analysis from an NLU engine 411 allowing for faster or real-time processing of conversational data to take place. As speech (audio) is received, an audio analyzer 420 uses a real time speech-to-text converter 421 to detect and convert audio speech data into text. A real time voice quality analyzer 422 collects and analyzes performance metrics for audio and voice quality. A real time classifier 423 classifies the audio it is receiving into a plurality of audio classes such as silence, speech, music, ring, comfort noise, earcons, etc. The real-time classifier 423 may operate in conjunction with the speech-to-text converter 421 to send only detected speech to the speech-to-text converter 421 to speed up operations and increase accuracy of conversion. Data from both the NLU engine 411 and KWS 412 is sent to a conversation manager 430, which performs analyses on the text to determine the context, dialect, level of formality, etc., of the communication. A context analyzer 431 may use word and phrase associations in both the query and response to determine the context in which the speech is taking place. A dialect analyzer 432 may use dictionaries of regional dialects and slang to determine the dialect that the writer or speaker of a particular communication is using. A formality analyzer 433 may use compilations of speech from persons of different educations, backgrounds, and occupations, as well as compilations of speech from persons in different settings (e.g., informal gatherings, office environments, weddings, etc.) as well as dictionaries of proper grammar and usage, slang, and the like, to determine a level of formality that the writer or speaker of the communication is using. In some embodiments, the real time conversation engine 330 will further comprise an output generator 440, which will use the information from the analyses from the conversation manager 430 to generate an outgoing communication that is appropriate in terms of context, dialect/slang, and level of formality to the incoming communication that was analyzed. For example, an incoming text query may contain informal slang speech from a particular dialect (often indicating that the writer is from a particular region), which dialect analyzer would identify as being a particular dialect and the formality analyzer 433 would recognize as being informal speech from that dialect. The outgoing communication would be generated by a natural language generation (NLG) engine 441, matching the dialect, slang, and level of formality of the customer. In an embodiment, outgoing communication from the NLG would match the dialect, slang, and level of formality of the a virtual customer as defined by the persona and test case associated with the virtual customer. Where the outgoing communication is audio, the text may be converted to speech using a real-time text-to-speech engine 442. In some embodiments, environmental cues may be introduced into the outgoing communication by an environment simulator 443 to make the communication seem more natural or "real." For example, where the context of the audio is an office environment, background noises from an office environment may be introduced into the audio, or where the writer of a text communication is riding on a bus, typographical errors may be introduced to simulate the environment (i.e., motion) of the bus.

Figure 5:
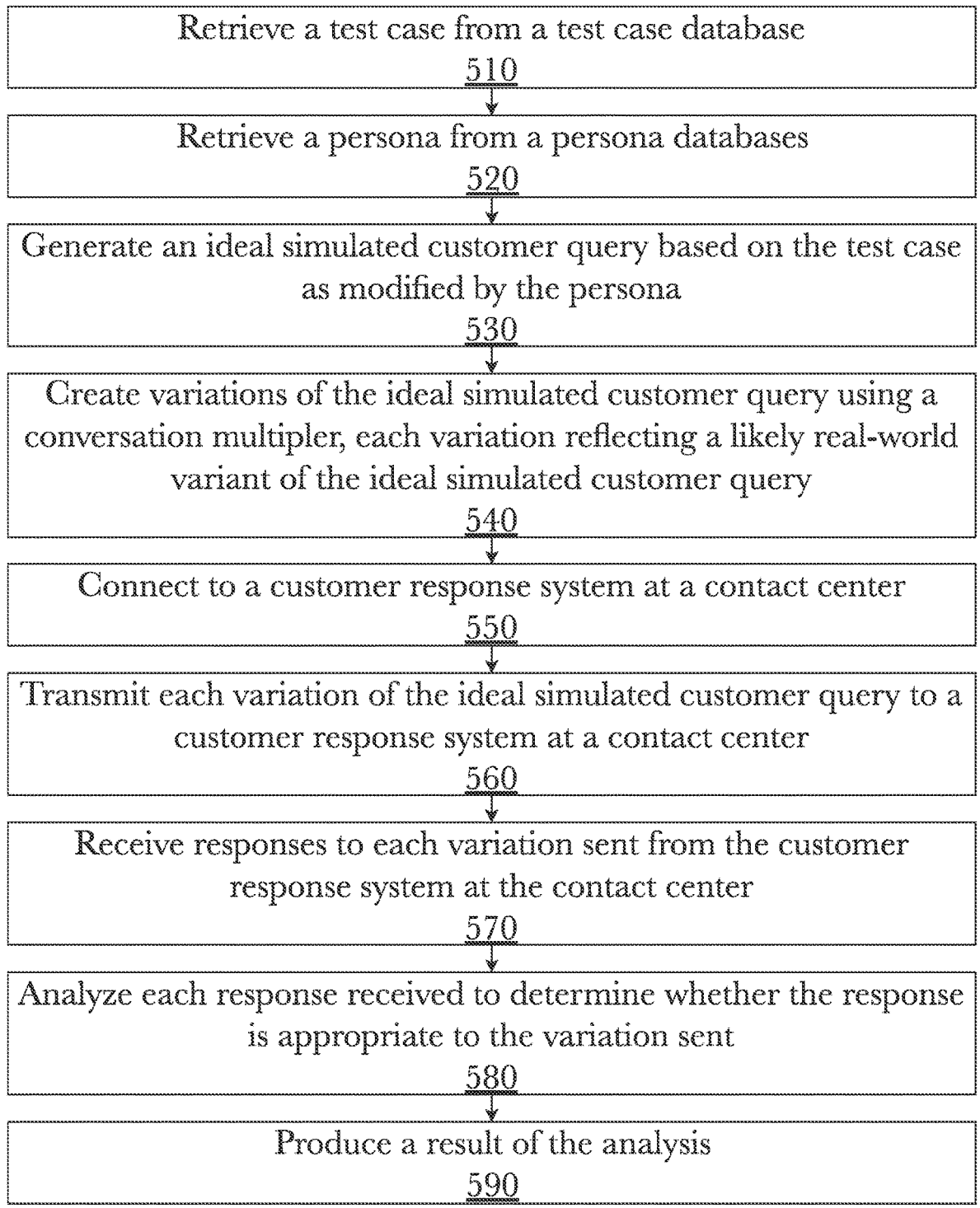
FIG. 5 is a method diagram illustrating exemplary functionality of the customer response testing system.

FIG. 5 is a method diagram illustrating exemplary functionality of the customer response testing system. First it retrieves a test case from a test case database 510, the test case comprising data on the entire expected interaction between the customer response testing system and the contact center under test. For instance, it may include data on an email query to be sent, an email reply to be received, and a final email response to be sent to the contact center. The testing system then retrieves a persona from a persona database 520 which includes either manually entered or automatically generated data to simulate an actual customer, such as a fake name and false personal information, to test the interaction of the contact center's communications with an actual customer depending on the requisite personal information required. The testing system then generates an ideal simulated customer query based on the test case as modified by the persona 530, before creating variations of the ideal simulated customer query using a conversation multiplier, each variation reflecting a likely real-world variant of the ideal simulated customer query 540, for instance using typos due to a simulated customer being on a bus during communication, or using neologisms or colloquial speech for a geographic region or customer persona as necessary, to test the contact center's responses to such variations in a customer query. After the queries are generated and multiplied, the testing system then connects to a customer response system at a contact center 550, whether through an email server, SMS server, chat server, or voice system, and transmits each variation of the ideal simulated customer query to a customer response system at a contact center 560 as appropriate. It then waits to receive responses to each variation sent from the customer response system at the contact center 570, on the expected channels as specified by the test case data, before analyzing each response received to determine whether the response is appropriate to the variation sent 580 and produce a result of the analysis 590, indicating how long the interaction took, whether responses given were the expected responses, and any errors or anomalies during the test execution.

Figure 6:
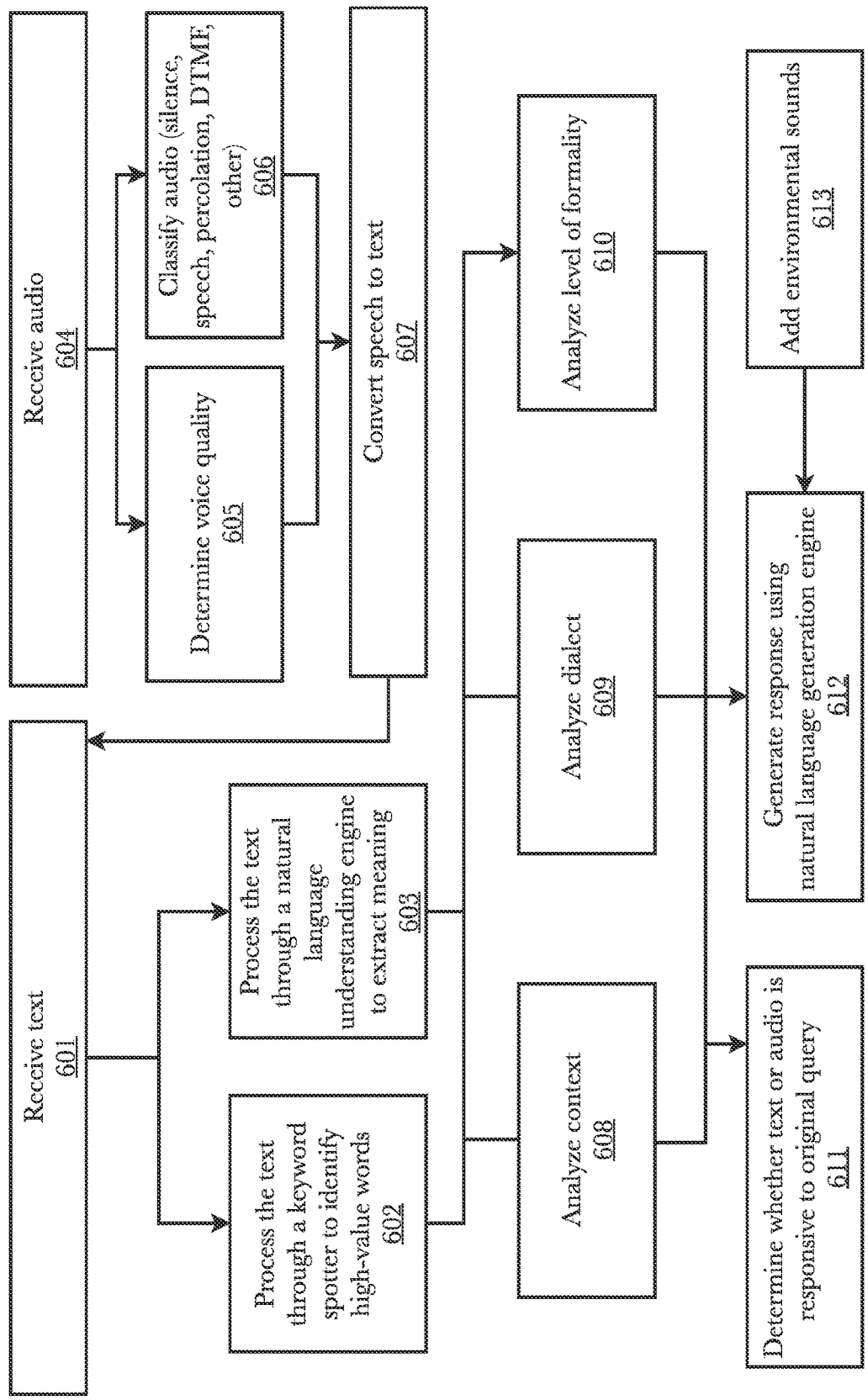
FIG. 6 is a method diagram illustrating exemplary functionality of the real time conversation engine.

FIG. 6 is a method diagram illustrating exemplary functionality of the real time conversation engine. In a first step, incoming text is received 601, and the text is analyzed using a natural language understanding (NLU) engine to analyze groupings of words or sentence fragments, punctuation, and individual words in order to understand language meaning for a given textual input 603. Simultaneously, the text is processed through a keyword spotter (KWS), which may locate individual high-value words such as nouns in a sentence faster than full analysis from an NLU engine allowing for faster or real-time processing of conversational data to take place 602. In a related step, incoming speech (audio) is received 604, and the audio is simultaneously processed to analyze performance metrics for audio and voice quality 605 and to classify portions of the audio 606 into a plurality of audio classes such as silence, speech, music, ring, comfort noise, earcons, etc. Portions of the audio that both meet a certain quality level and are classified as speech are then converted to text 607, which is then sent for further textual analysis as in steps 601, et seq. Text that has been processed through an NLU engine 603 and subjected to keyword spotting 602 is then sent for contextual 608, dialectic 609, and formality analysis 610. At the context analysis stage 608, a context analyzer may use word and phrase associations in both the query and response to determine the context in which the speech is taking place. At the dialectic analysis stage 609, a dialect analyzer may use dictionaries of regional dialects and slang to determine the dialect that the writer or speaker of a particular communication is using. At the formality analysis stage 610, a formality analyzer may use compilations of speech from persons of different educations, backgrounds, and occupations, as well as compilations of speech from persons in different settings (e.g., informal gatherings, office environments, weddings, etc.) as well as dictionaries of proper grammar and usage, slang, and the like, to determine a level of formality that the writer or speaker of the communication is using. In some embodiments, the incoming communication (text or audio) may be passed through a response analyzer, which compares the response with the original query to determine the quality and appropriateness of the response 611, although this step may also be performed outside of the real-time conversation engine.

In some embodiments, the real time conversation engine will use the information from the contextual, dialectic, and formality analyses to generate an outgoing communication that is appropriate in terms of context, dialect/slang, and level of formality to the incoming communication that was analyzed 612. For example, an incoming text query may contain informal slang speech from a particular dialect (often indicating that the writer is from a particular region), which dialectic analysis would identify as being a particular dialect and the formality analysis would recognize as being informal speech from that dialect. The outgoing communication would be generated by a natural language generation (NLG) engine using the same dialect and a similar level of informality. Where the outgoing communication is audio, the text may be converted to speech using a real-time text-to-speech engine (not shown). In some embodiments, environmental cues may be introduced into the outgoing communication by an environment simulator to make the communication seem more "real" or natural 613. For example, where the context of the audio is an office environment, background noises from an office environment may be introduced into the audio, or where the writer of a text communication is riding on a bus, typographical errors may be introduced to simulate the environment (i.e., motion) of the bus.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 7:
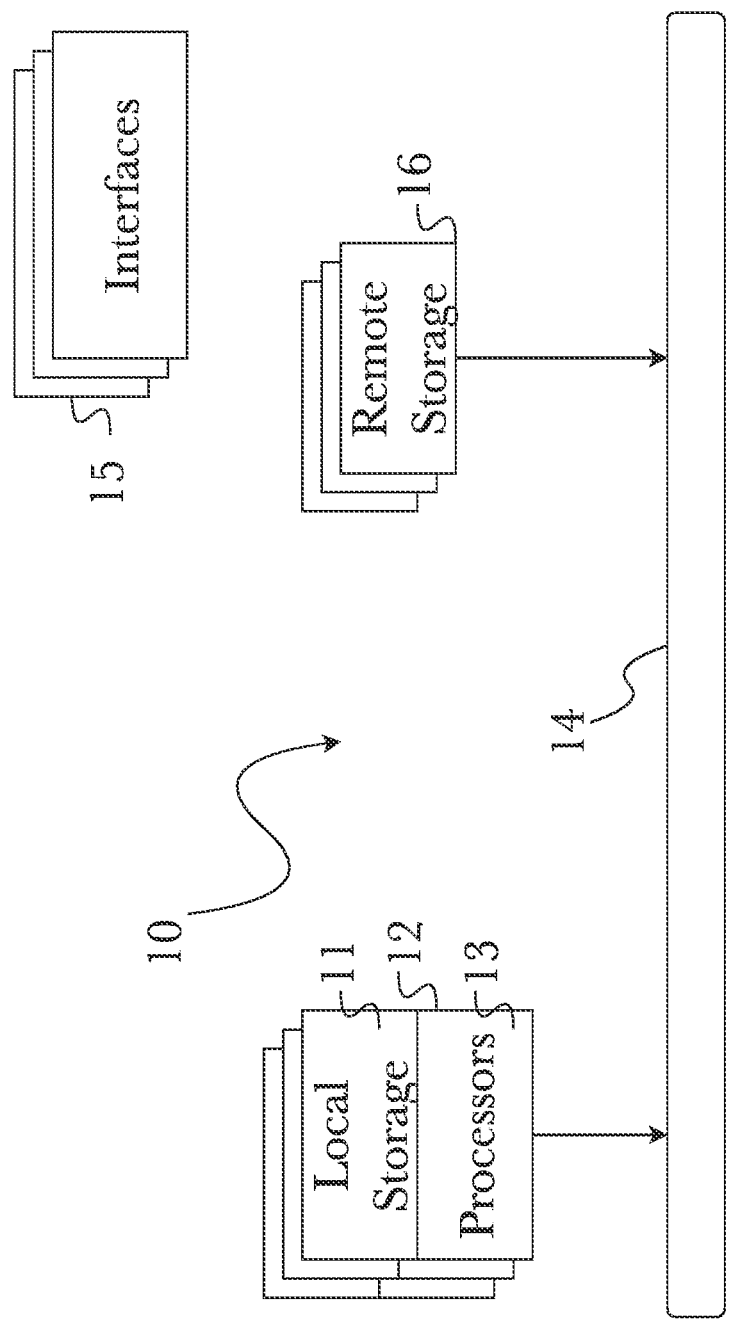
FIG. 7 is a block diagram illustrating an exemplary hardware architecture of a computing device used in an embodiment of the invention.

Referring now to FIG. 7, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network, a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (eSATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 7 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 8:
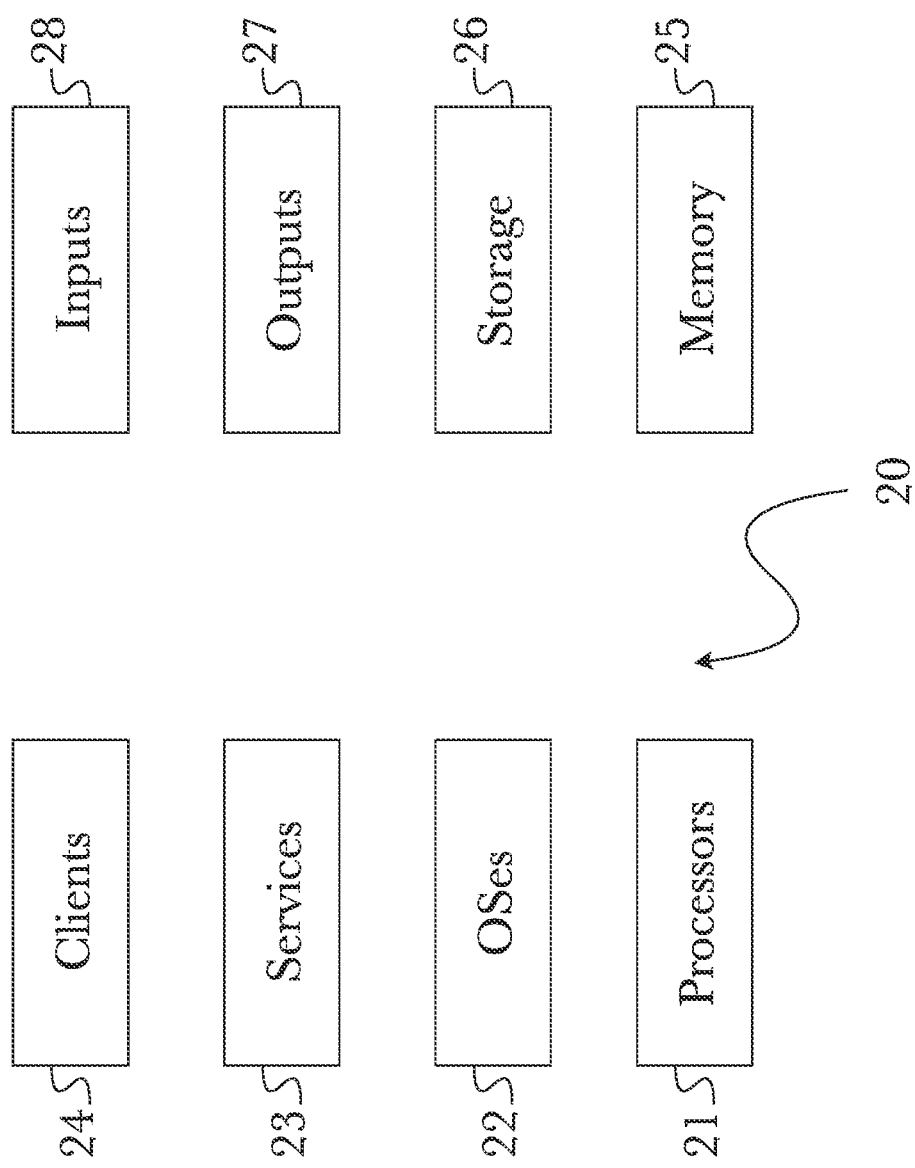
FIG. 8 is a block diagram illustrating an exemplary logical architecture for a client device, according to an embodiment of the invention.

In some aspects, systems may be implemented on a standalone computing system. Referring now to FIG. 8, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 7). Examples of storage devices 26 include flash memory, magnetic hard drive, CD-ROM, and/or the like.

Figure 9:
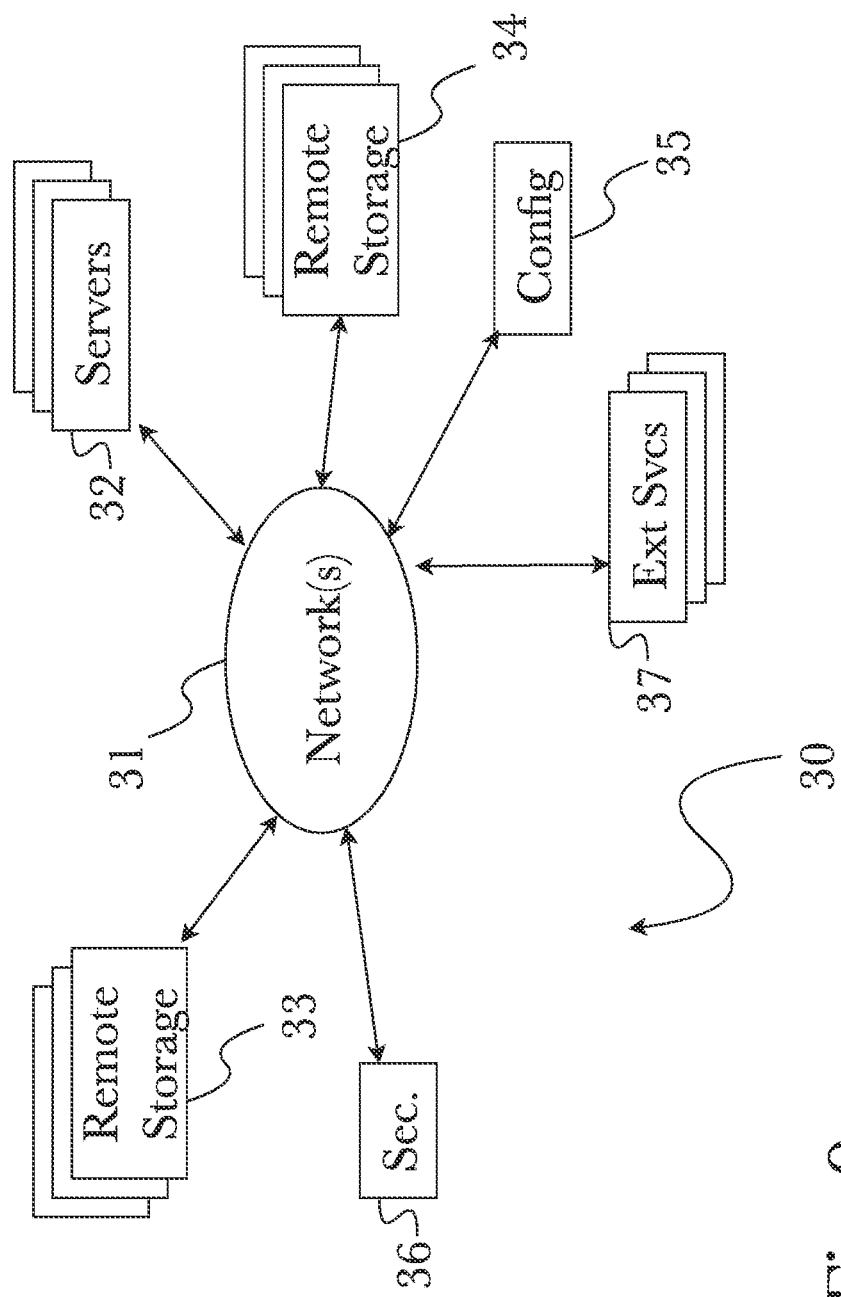
FIG. 9 is a block diagram showing an exemplary architectural arrangement of clients, servers, and external services, according to an embodiment of the invention.

In some aspects, systems may be implemented on a distributed computing network, such as one having any number of clients and/or servers. Referring now to FIG. 9, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 8. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 10:
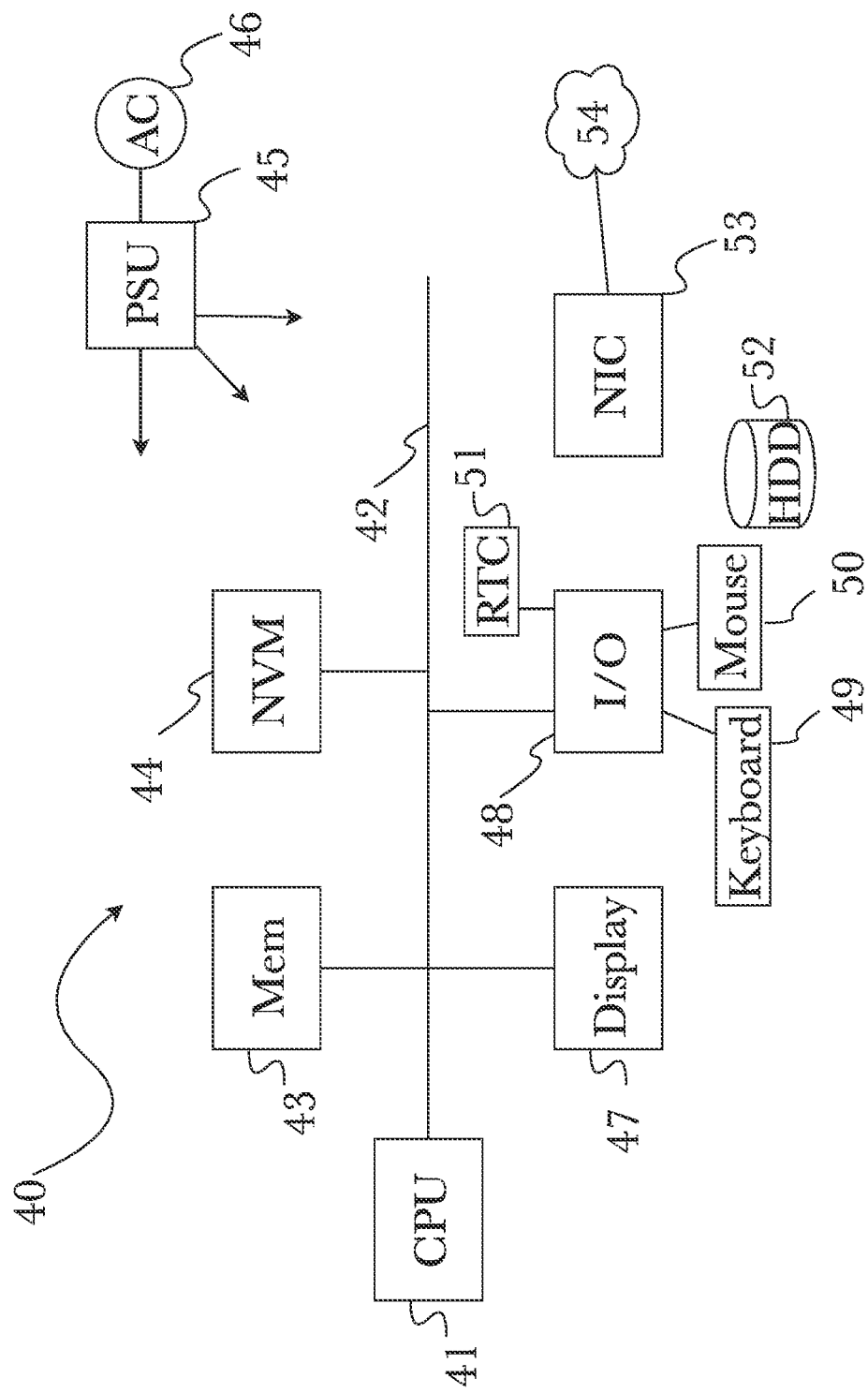
FIG. 10 is another block diagram illustrating an exemplary hardware architecture of a computing device used in various embodiments of the invention.

FIG. 10 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for testing of automated customer response systems at contact centers, comprising:
   a customer response testing system comprising a first plurality of programming instructions stored in a memory of, and operating a processor of, a computing device, wherein the first plurality of programming instructions, when operating on the processor, cause the computing device to:
   retrieve a test case from a database;
   retrieve a customer persona from the database;
   generate a simulated customer query based on the test case;
   create variations of the simulated customer query using a conversation multiplier, each variation reflecting a likely real-world variant of the simulated customer query;
   modify each query variation based on the customer persona, each modification reflecting one or more traits of the customer persona;
   connect to a customer response system;
   transmit each modified query variation of the simulated customer query to the customer response system; and
   receive responses to each modified query variation sent from the customer response system.

2. The system of claim 1, further comprising a real time conversation engine comprising a second plurality of programming instructions stored in the memory of, and operating on the processor of, the computing device, wherein the second plurality of programming instructions, when operating on the processor, cause the computing device to:
   receive one or more of the modified query variations;
   analyze the one or more of the modified query variations to determine a context, dialect, or level of formality;
   receive a response corresponding to each of the one or more of the modified query variations;
   analyze each to determine a context, dialect, or level of formality; and
   compare the analysis of each of the one or more of the modified query variations with the corresponding response for that modified query variation to determine an appropriateness of the response.

3. The system of claim 1, wherein the received responses are analyzed to determine whether the response is appropriate to the modified query variation sent.

4. The system of claim 3, wherein a result of the analysis is produced.

5. A method for testing of automated customer response systems at contact centers, comprising the steps of:
   retrieving a test case from a database;
   retrieving a customer persona from the database;
   generating a simulated customer query based on the test case as modified by the customer persona;
   creating variations of the simulated customer query using a conversation multiplier, each variation reflecting a likely real-world variant of the simulated customer query;
   modifying each query variation based on the customer persona, each modification reflecting one or more traits of the customer persona;
   connecting to a customer response system;

transmitting each modified query variation of the simulated customer query to the customer response system; and receiving responses to each modified query variation sent from the customer response system center.

6. The method of claim 5, further comprising the steps of:

receiving one or more of the modified query variations;

analyzing the one or more of the modified query variations to determine a context, dialect, or level of formality;

receiving a response corresponding to each of the one or more of the modified query variations;

analyzing each to determine a context, dialect, or level of formality; and comparing the analysis of each of the one or more of the modified query variations with the corresponding response for that modified query variation to determine an appropriateness of the response.

7. The method of claim 5, wherein the received responses are analyzed to determine whether the response is appropriate to the modified query variation sent.

8. The method of claim 7, wherein a result of the analysis is produced.

\* \* \* \* \*